United States Patent
Harrington

(10) Patent No.: US 8,984,397 B2
(45) Date of Patent: Mar. 17, 2015

(54) ARCHITECTURE FOR ARBITRARY EXTENSIBLE MARKUP LANGUAGE PROCESSING ENGINE

(75) Inventor: Steven J. Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 2884 days.

(21) Appl. No.: 11/304,857

(22) Filed: Dec. 15, 2005

(65) Prior Publication Data

US 2007/0143666 A1    Jun. 21, 2007

(51) Int. Cl.
*G06F 17/22*    (2006.01)

(52) U.S. Cl.
CPC ........ *G06F 17/2247* (2013.01); *G06F 17/2229* (2013.01)
USPC ............................. 715/236; 715/235; 715/239

(58) Field of Classification Search
USPC .................... 717/114–115; 715/235–236, 239
See application file for complete search history.

(56) References Cited

U.S. PATENT DOCUMENTS

| | | | |
|---|---|---|---|
| 6,370,553 B1 | 4/2002 | Edwards et al. | |
| 6,397,231 B1 | 5/2002 | Salisbury et al. | |
| 6,519,617 B1 | 2/2003 | Wanderski et al. | |
| 6,540,142 B1 | 4/2003 | Alleshouse | |
| 6,606,642 B2 * | 8/2003 | Ambler et al. | 709/200 |
| 6,655,593 B2 | 12/2003 | Alleshouse | |
| 6,748,569 B1 * | 6/2004 | Brooke et al. | 715/207 |
| 6,829,745 B2 * | 12/2004 | Yassin et al. | 715/236 |
| 6,908,034 B2 | 6/2005 | Alleshouse | |
| 6,912,538 B2 | 6/2005 | Stapel | |
| 6,925,631 B2 * | 8/2005 | Golden | 717/115 |
| 6,941,511 B1 * | 9/2005 | Hind et al. | 715/235 |
| 7,143,104 B1 | 11/2006 | Turba | |
| 7,152,205 B2 | 12/2006 | Day et al. | |
| 7,284,196 B2 | 10/2007 | Skeen et al. | |

(Continued)

FOREIGN PATENT DOCUMENTS

WO    WO2004084094    9/2004

OTHER PUBLICATIONS

The prosecution history between Apr. 2, 2010 and Oct. 4, 2010 for U.S. Appl. No. 11/610,950, filed Dec. 14, 2006, published Jun. 28, 2007, publication No. US-2007-0150494-A1; Inventors S.J. Harrington and E. Wayman.
The prosecution history between Aug. 9, 2010 and Nov. 16, 2010 of U.S. Appl. No. 11/610,324, filed Dec. 13, 2006, published Jun. 28, 2007, publication No. US-2007-0150808-A1; Inventor S.J. Harrington.

(Continued)

*Primary Examiner* — Kavita Padmanabhan
*Assistant Examiner* — Zaida I Marrero
(74) *Attorney, Agent, or Firm* — Michael J. Nickerson; Basch & Nickerson LLP

(57) ABSTRACT

An extensible markup language document processing engine performs arbitrary processing on extensible markup language documents. The processing sequence of the extensible markup language document processing engine is not fixed, but rather can depend upon the information submitted with the job and upon determinations and analysis during the actual job processing. The extensible markup language document processing engine can also segment the document processing so that different fragments of the document are handled differently, thereby providing parallel processing capabilities. Moreover, the extensible markup language document processing engine can segment the document processing so that different fragments of the document are handled differently so that not all processing is blocked when a fragment requires a slow action, such as retrieval of information from the web.

11 Claims, 2 Drawing Sheets

(56) References Cited

U.S. PATENT DOCUMENTS

| | | | |
|---|---|---|---|
| 7,409,400 B2 | 8/2008 | Ramarao | |
| 2001/0018697 A1* | 8/2001 | Kunitake et al. | 707/517 |
| 2001/0039594 A1* | 11/2001 | Park et al. | 709/311 |
| 2002/0010715 A1 | 1/2002 | Chinn et al. | |
| 2002/0040353 A1 | 4/2002 | Brown, Jr. et al. | |
| 2002/0073399 A1* | 6/2002 | Golden | 717/114 |
| 2002/0107913 A1* | 8/2002 | Rivera et al. | 709/203 |
| 2002/0111963 A1* | 8/2002 | Gebert et al. | 707/513 |
| 2002/0194227 A1 | 12/2002 | Day et al. | |
| 2003/0058469 A1* | 3/2003 | Buis et al. | 358/1.15 |
| 2003/0061229 A1* | 3/2003 | Lusen et al. | 707/102 |
| 2003/0088543 A1 | 5/2003 | Skeen et al. | |
| 2003/0184789 A1 | 10/2003 | Komaki | |
| 2003/0227640 A1* | 12/2003 | Liang et al. | 358/1.13 |
| 2003/0237046 A1 | 12/2003 | Parker et al. | |
| 2004/0060004 A1 | 3/2004 | Mani et al. | |
| 2004/0088647 A1* | 5/2004 | Miller et al. | 715/500 |
| 2004/0193465 A1* | 9/2004 | Sangroniz et al. | 705/8 |
| 2004/0205656 A1* | 10/2004 | Reulein et al. | 715/530 |
| 2004/0216030 A1 | 10/2004 | Hellman et al. | |
| 2004/0261017 A1* | 12/2004 | Perry | 715/513 |
| 2004/0268229 A1* | 12/2004 | Paoli et al. | 715/508 |
| 2005/0004893 A1* | 1/2005 | Sangroniz | 707/3 |
| 2005/0021799 A1* | 1/2005 | Imamura et al. | 709/230 |
| 2005/0050466 A1* | 3/2005 | Sangroniz et al. | 715/526 |
| 2005/0055420 A1 | 3/2005 | Wyler | |
| 2005/0150953 A1 | 7/2005 | Alleshouse | |
| 2005/0171970 A1 | 8/2005 | Ozzie et al. | |
| 2005/0204280 A1* | 9/2005 | Eves et al. | 715/513 |
| 2006/0167909 A1 | 7/2006 | Mendis et al. | |
| 2006/0271506 A1 | 11/2006 | Bohannon et al. | |
| 2006/0271850 A1* | 11/2006 | Gombert et al. | 715/523 |
| 2007/0150494 A1 | 6/2007 | Harrington et al. | |
| 2007/0150808 A1 | 6/2007 | Harrington | |
| 2007/0198539 A1 | 8/2007 | Warshavsky et al. | |
| 2007/0226610 A1* | 9/2007 | Da Silva et al. | 715/523 |
| 2007/0245232 A1 | 10/2007 | Wake et al. | |

OTHER PUBLICATIONS

Anand, Sai et al.; "Mapping XML Instances"; (WWW 2005, May 10-14, 2005) Association for Computing Machinery, (May 5, 2005) pp. 888-889 (2 pages).

Berners-Lee, Tim et al.; Hypertext Markup Language—2.0; MIT W3C; Nov. 1995; Standards Track; Request for Comments 1866: W3 Consortium, pp. 1-77 + blank end sheet (78 pgs).

Bossung et al, "Automated data mapping specification via schema heuristics and user interaction" Oct. 18, 2004, IEEE, pp. 1-10 + one abstract page, (11 pgs).

Bossung, Sebastian et al. "Automated data mapping specification via schema heuristics and user interaction". ASE, 19$^{th}$ IC, Sep. 2004, IEEE Computer Society, 10 pgs.

Bossung, Sebastian et al. "Semi-automatic discovery of mapping rules to match XML Schemes"; Nov. 25, 2003, University of Auckland, NZ; pp. 1-71+ 2 cover, (73 pgs).

Boukottaya, Aida et al. "Automating XML document Transformations: A conceptual modelling based approach". 2004, Australian Computer Society. Inc., Australia p. 81-90 (10 pgs) APCCM '04 V. 31.

Somchai et al. (Chatvichienchai) "Authorization Translation for XML Document Transformation", 2004, Kluwer Academic Publishers, p. 1-28.

Embley, David W. et al. "Automatic Direct and Indirect Schema Mapping: Experiences and Lessons Learned"; Association for Computing Machinery, NY; 2004; 6 pages.

Su, Hong et al. "Automating the Transformation of XML Documents"; Association for Computing Machinery, NY; 2001; 8 pages.

The file history as of Aug. 9, 2010 for U.S. Appl. No. 11/610,950, filed Dec. 13, 2006, published Jun. 28, 2007 as US-2007-0150808-A1; Inventor Steven J. Harrington.

The file history as of Aug. 9, 2010 for U.S. Appl. No. 11/610,324, filed Dec. 14, 2006, published Jun. 28, 2007 as US-2007-0150494-A1; Inventors S.J. Harrington; E. Wayman.

* cited by examiner

ARCHITECTURE FOR ARBITRARY EXTENSIBLE MARKUP LANGUAGE PROCESSING ENGINE

BACKGROUND

Encoding documents for digital printing is conventionally done in a document or image processing device that is typically separate from the printing device. The processing device may be a personal computer or other document/image processing/generation device. The processing device, typically, has a generic print driver application that encodes and sends documents for reproduction by a particular printer connected thereto, through a communication channel or network.

The generation of standard document types is a growing trend. Such standards have been greatly encouraged and facilitated by the use of the standard extensible markup language. However, the reproduction of standard extensible markup language is not an easy task as the standard extensible markup language has been, conventionally, converted by the user into some type of format that is readily acceptable to a printing device.

Moreover, most conventional extensible markup language processing systems have been designed to handle specific processing with respect to specific extensible markup language vocabularies. Although a few conventional extensible markup language platforms have been created for the development of different processing sequences in support of different vocabularies and workflows, these conventional platforms are still fixed and static.

Thus, it is desirable to provide an extensible markup language processing system that can efficiently print any submitted arbitrary sequence of extensible markup language vocabularies. Moreover, it is desirable to provide an extensible markup language processing system that can efficiently perform the diverse processing that submitted arbitrary sequence of extensible markup language vocabularies may require.

A processing system includes an extensible markup language processing engine and a workflow selection engine. The workflow selection engine receives workflow specifications and document fragments to be processed and outputs workflow specifications and document fragments to the extensible markup language processing engine. The extensible markup language processing engine produces a new workflow specification and a modified document fragment. The extensible markup language processing engine outputs the new workflow specification and modified document fragment to the workflow selection engine.

A workflow selection engine for an extensible markup language processing system includes an initial fragment generator to break the initial document up into document fragments and workflow specifications; a workflow specification pool operatively connected to the initial fragment generator; a document fragment pool operatively connected to the initial fragment generator; a workflow selector, operatively connected to the workflow specification pool and the document fragment pool, to determine whether resources required to support extensible markup language processing are available; and a processed fragment and workflow separator operatively connected to the workflow specification pool and the document fragment pool, to separate extensible markup language process data into processed fragments and workflow specifications. The workflow selector outputs appropriate document fragments and workflow specifications to an extensible markup language processing engine.

A method for an extensible markup language processing breaks up an initial document into document fragments and workflow specifications; pools workflow specifications; pools document fragments; determines whether resources required to support extensible markup language processing are available; processes a document fragment in accordance with an associated workflow specification to produce a new workflow specification and modified document fragment; processes a document fragment in accordance with an associated workflow specification to produce a modified document fragment; processes appropriate modified document fragments and associated new workflow specifications; and outputs appropriate modified document fragments as a final document.

BRIEF DESCRIPTION OF THE DRAWINGS

The drawings are only for purposes of illustrating an embodiment and is not to be construed as limiting, wherein.

DETAILED DESCRIPTION

Figure 1:
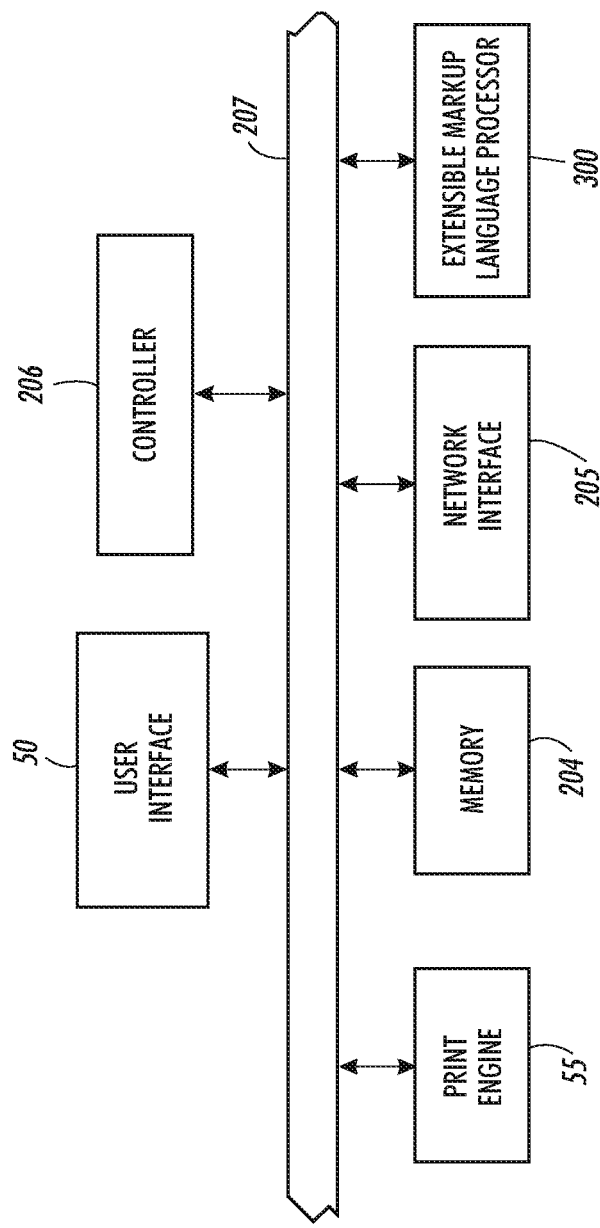
FIG. 1 illustrates the architecture of a device with an embedded extensible markup language processor.

For a general understanding, reference is made to the drawings. In the drawings, like references have been used throughout to designate identical or equivalent elements. It is also noted that the drawings may not have been drawn to scale and that certain regions have been purposely drawn disproportionately so that the features and concepts could be properly illustrated.

FIG. 1 illustrates an overall system architecture that includes a print engine 55, a user interface 50, a memory 204, a network interface 205, a controller 206, an extensible markup language processor 300, and a bus 207.

The print engine 55 converts digital signals representing an image into a hardcopy of that image on a recording medium. A central bus 207 provides interconnections and intercommunications between the various modules and devices connected thereto. A memory 204 store a variety of information such as machine fault information, machine history information, images to be processed at a later time, instruction sets for the machine, job instruction sets, etc.

The user interface 50 allows the user to select the various functions of the digital printing device, program various job attributes for the particularly selected function, provide other input to the digital printing device, as well as, display informational data from the digital printing device. The controller 206 controls all the functions within the digital printing device so as to coordinate all the interactions between the various modules and devices.

The extensible markup language processor 300 receives extensible markup language data and converts this data into a page description language, rasterized image or other form, which can readily utilized by the controller 206 and print engine 55 to generate the appropriate document or image for printing or for display or for archival and storage. The details of this process will be explained in more detail below.

The following descriptions will useful in understanding the operations of the extensible markup language processor.

Extensible markup language is a conventional standards-based way of organizing data and metadata in the same document. More specifically, extensible markup language is not a fixed format, but rather a meta language that enables the design of customized markup languages for different types of documents. Extensible markup language is a markup language because every structural element is marked by a start tag and an end tag giving the name of the element. In other words, the metadata of the extensible markup language is enclosed within tags. With respect to the input stream of the document, a tag may be delimited by the symbols "<" and ">". In one implementation, extensible markup language can be used as the format for receiving input data and metadata.

An extensible markup language vocabulary is a collection of extensible markup language tags (element and attribute names) intended to be used together as a single markup language. An extensible stylesheet language transform is a set of rules for transforming a source extensible markup language document into a result extensible markup language document, using the syntax defined in extensible stylesheet language transformations. Extensible stylesheet language transformations are often used to insert styling instructions into an extensible markup language document or to convert the extensible markup language document into an extensible markup language vocabulary designed for formatting.

An extensible stylesheet language transform imparts style to the data and can also be a general tree transformation language. Moreover, an extensible markup language schema is the formal definition of an extensible markup language vocabulary.

An extensible stylesheet language transform is can be used for expressing a mapping of metadata tags and print format instructions.

Since an extensible stylesheet language transform and an extensible markup language schema are text based documents, the extensible stylesheet language transform and extensible markup language schema can be easily stored in a memory. Although extensible stylesheet language transforms can be written that work well in the absence of an extensible markup language schema, more expressive mappings can be written in an extensible stylesheet language transform if an extensible markup language schema for the input document is supplied.

The extensible stylesheet language is an extensible markup language vocabulary for specifying formatting semantics and language transformations.

As noted above, extensible markup language processing systems have been designed to handle specific processing on specific extensible markup language vocabularies and workflows. Vocabularies are developed for specific problems and needs. The workflows to handle those problems are generally fixed such that each extensible markup language file undergoes the same processing steps.

Conventional extensible markup language processing systems have also been designed for the development of different processing sequences in support of different vocabularies and workflows. However, these extensible markup language processing systems are still fixed and static.

More specifically, these extensible markup language processing systems assemble pipelines of processing steps so that the system has a variety of processing steps from which to choose. However, notwithstanding the variety, the extensible markup language process is defined by a fixed sequence of steps. Extensible markup language files can be processed through the pipeline, but the pipeline is not dynamic or reconfigurable. Further, if any step in the pipeline stalls (e.g. while waiting on data retrieval) all of the processing is temporarily halted.

Thus, it is desirable to provide an extensible markup language processing system that is able to efficiently print any arbitrary sequence of extensible markup language vocabularies that are submitted. More specifically, it is desirable to provide an extensible markup language processing system that is able to provide a printing component that can support any workflow as well as arbitrary submissions.

Extensible markup language files differ from traditional page description language files in the degree of document completion. While some vocabularies (such as scalable vector graphics) may be laid out and ready for printing, other vocabularies require more processing before printing can be attempted. The processing can include retrieval of information and insertion of files, conducting database queries, performing transformations, styling, formatting, and layout. Different vocabularies and even different jobs using the same vocabulary can require different processing specifications.

Figure 2:
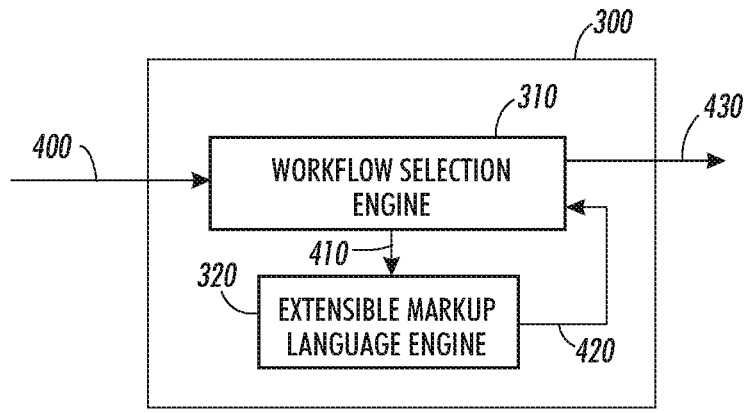
FIG. 2 illustrates a block diagram of an extensible markup language processing system.

FIG. 2 illustrates a system and architecture for extensible markup language document processing engine 300 that addresses the various problems discussed above. The extensible markup language document processing engine 300 is suitable for parallel processing of dynamically determined workflows.

As illustrated in FIG. 2, the extensible markup language document processing system 300 receives two basic data element types 420, a document fragment and a workflow specification. There are many options for how these two data elements are implemented For example, in an object oriented implementation, document fragment objects and workflow specification objects could be defined. Alternatively, in another system, a document fragment could be defined as a uniform resource locator, and the processing in a workflow specification might be defined as the selection of a predefined pipeline. Another option might be to represent document fragments as files and workflow specifications as scripts. Each workflow specification has a corresponding document fragment. It is noted that a document fragment and its workflow specification might be combined into a single object.

A document fragment's workflow specification describes the processing that should be carried out on that document fragment. The conventional extensible markup language document processing system typically results in one or more new or revised document fragments. However, the extensible markup language document processing engine 300 differs from the conventional systems in that the extensible markup language document processing engine 300 also generates new workflow specifications.

The extensible markup language document processing system 300 deciphers the workflow specification in the workflow selection engine 310. The extensible markup language document processing system 300 also performs the processing on a document fragment in the extensible markup language engine 320. The extensible markup language engine 320 receives workflow specifications and document fragments to be processed 410. Upon receiving this data, extensible markup language engine 320 decides which pipeline is specified for the document fragment and runs that document fragment through the pipeline. However, as noted above, in this architecture, the pipelines of the extensible markup language engine 320 produce new workflow specifications as well as modified fragments 400.

The results 400 of the processing operations of the extensible markup language engine 320 are fed back to the workflow selection engine 310. The workflow selection engine 310 determines if the received results 400 are a final output 430 or require further processing 410.

A workflow specification may indicate processing that requires or integrates additional information beyond the fragment itself. For example, the workflow specification might require the insertion of data from a file or other fragment. Also, the workflow specification might transform the fragment using an additional style sheet or validate the fragment using an additional schema. The workflow specification might include a list of the required resources.

Moreover, a workflow specification may indicate processing that produces more than one fragment-workflow specification pair as its result. For example, the workflow specification might subdivide the fragment into smaller fragments. In that case, the process would result in a set of sub-fragments, each sub-fragment having a workflow specification, and, optionally, a fragment that references the set of sub-fragments and a workflow specification that reintegrates the processed sub-fragments.

The extensible markup language document processing engine 300 also determines, configures, and performs diverse processing which various jobs may require. In addition, the extensible markup language document processing engine 300 can separate the processing into multiple independent threads, where appropriate, so that if one thread is blocked or delayed, processing can still continue on other threads.

As noted before, the workflow specification indicates the processing to be done on a document fragment. However, processing, from time to time, may involve requiring the use of additional information or resources, as illustrated in FIG. 2. In these instances, the workflow specification may list the resources. This is particularly desirable when the resources are other processed document fragments. The information involving the use of additional information or resources is used by a workflow selection engine.

Figure 3:
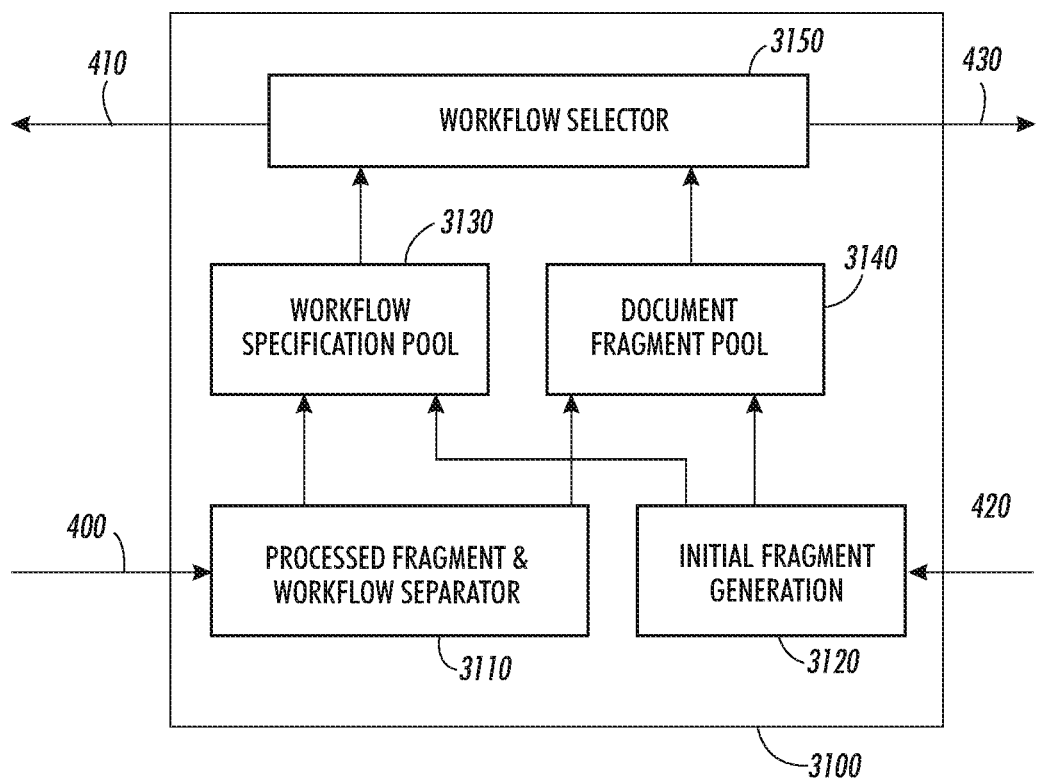
FIG. 3 illustrates a block diagram of another example of a workflow selection engine for an extensible markup language processor.

An example of a workflow selection engine is illustrated in FIG. 3. As illustrated in FIG. 3, an initial document 420 is received by an initial fragment generator 3120 which breaks the initial document 420 up into document fragments and workflow specifications. It is noted often the document will be handled as a single fragment and workflow.

The initial fragment generator 3120 send the workflow specifications to a workflow specification pool 3130 and sends the document fragments to a document fragment pool 3140. A workflow selector 3150 examines the workflow specifications to determine whether the resources required to support the processing are available to process the initial document 420.

For example, if the workflow specification indicates the aggregation of previously processed sub-fragments, a workflow selector 3150 determines if the processing of these sub-fragments has been completed. The workflow selector 3150 decides which fragments are ready for processing and submits the fragments 410 to the extensible markup language processing engine 320 of FIG. 2. The workflow selector 3150 also determines when all processing on the document is complete and outputs the final result 430.

A processed fragment and workflow separator 3110 collects the results 400 from the extensible markup language processing engine 320 of FIG. 2 and stores the separated results in the document fragment pool 3140 and workflow specification pool 3130.

One possible implementation of the workflow selection engine 3100 is as a web service that interacts with other services. Alternatively, the workflow selection engine 3100 might be implemented as a method that operates on a workflow pool object in a more direct programming approach.

While the workflow pool and workflow selection engine, as described, provide the ability to select and process some fragments, even when the processing of other fragments is delayed, simpler implementations are possible. One could, for example, use a simple queue as the workflow pool and a straightforward sequential model for the workflow selection.

In operations, the workflow selection engine 3100 accepts a document 420 for processing. Using the initial fragment generator 3120, the document and associated job information are separated into an initial fragment and workflow specification. The initial fragment and workflow specification 410 is then submitted to the extensible markup language processing engine 320 of FIG. 2 and the results 400 returned. For simple jobs, this may be all that is necessary and the processed fragment would be output.

However, some processing options might be analyzers that decide what additional processing is needed. The analyzers result in new workflow specifications, not just modified documents.

For example, a document may be transformed in such a way as to generate file inclusions, database queries, or additional transformations. In the workflow selection engine 3100, an analyzer detects the transformation and specifies the appropriate additional processing, thereby avoiding the anticipating of such possibilities in advance and predefining the processing pipeline.

The workflow selection engine 3100 may also detect processing that requires external resources. If the workflow selection engine 3100 detects the requirement for external resources, the workflow selection engine 3100 separates the external resource processing into its own fragment and workflow specification. In this way, delays in resource acquisition need not block other processing.

It is noted that there is no requirement that the document fragment pool 3140 and workflow specification pool 3130 contain elements from only one document. The workflow selection engine 3100 may allow multiple documents as well as multiple parts of a document to be processed in parallel.

Moreover, workflow selection engine 3100 might construct workflows dynamically. On the other hand, workflow selection engine 3100 may select from a set of basic predefined workflows, such as: check the syntax of a fragment to see if it is well-formed; examine the namespaces of a fragment and separate into sub-fragments by namespace, including a fragment for reintegration; examine the fragment for special namespaces (e.g. scalable vector graphics, extensible stylesheet language formatting objects, extensible hypertext markup language, personalized print markup language template) and assign a matching workflow specification; examine a fragment and determine what style transformation if any should be applied and assign a workflow to apply the transformation; separate file inclusions as sub-fragments and specify workflows to retrieve and insert the files, also constructing a fragment for the reintegration; insert files specified by a fragment and assign a workflow to analyze the result for further processing; and/or apply a transformation to a fragment and assign a workflow to analyze the result for further processing.

In summary, the extensible markup language document processing engine performs arbitrary processing on extensible markup language documents. The processing sequence of the extensible markup language document processing engine is not fixed, but rather can depend upon the information submitted with the job and upon determinations and analysis during the actual job processing. The extensible markup language document processing engine can also segment the document processing so that different fragments of the document are handled differently, thereby providing parallel processing capabilities. Moreover, the extensible markup language document processing engine can segment the document processing so that different fragments of the document are handled differently so that not all processing is blocked when a fragment requires a slow action, such as retrieval of information from the web.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A processing system, comprising:
    an extensible markup language processor; and
    a workflow selection processor;
    said workflow selection processor receiving workflow specifications and document fragments to be processed, a workflow specification describing a process to be carried out on a corresponding document fragment;
    said workflow selection processor outputting workflow specifications and document fragments to said extensible markup language processor;
    said extensible markup language processor producing a new workflow specification and a corresponding modified document fragment;
    said extensible markup language processor outputting said new workflow specification and corresponding modified document fragment to said workflow selection processor;
    said extensible markup language processor analyzing a document fragment to determine a new workflow specification.

2. The processing system as claimed in claim 1, wherein said workflow selection processor combines various related document fragments to produce a final document output.

3. The processing system as claimed in claim 1, wherein said workflow selection processor prepares said workflow specification and modified document fragment for further processing.

4. The processing system as claimed in claim 1, wherein said extensible markup language processor acquires required resources.

5. The processing system as claimed in claim 1, wherein said extensible markup language processor transforms a document fragment.

6. The processing system as claimed in claim 1, wherein said extensible markup language processor converts a document fragment into a print engine consumable form.

7. The processing system as claimed in claim 1, wherein said extensible markup language processor converts a document fragment into a display suitable form.

8. The processing system as claimed in claim 1, wherein said extensible markup language processor converts a document fragment into an archival or storage suitable form.

9. The processing system as claimed in claim 1, wherein said extensible markup language processor transfers a document fragment to a printing device.

10. The processing system as claimed in claim 1, wherein said extensible markup language processor transfers a document fragment to a display device.

11. The processing system as claimed in claim 1, wherein said extensible markup language processor transfers a document fragment to an archival device.

\* \* \* \* \*